United States Patent
Christoph et al.

(10) Patent No.: US 10,790,874 B2
(45) Date of Patent: Sep. 29, 2020

(54) ACOUSTIC ECHO CANCELLATION WITH ROOM CHANGE DETECTION

(71) Applicant: Harman Becker Automotive Systems GmbH, Karlsbad (DE)

(72) Inventors: Markus Christoph, Straubing (DE); Vasudev Kandade Rajan, Straubing (DE)

(73) Assignee: Harman Becker Automotive Systems GmbH (DE)

( * ) Notice: Subject to any disclaimer, the term of this patent is extended or adjusted under 35 U.S.C. 154(b) by 0 days.

(21) Appl. No.: 16/561,436

(22) Filed: Sep. 5, 2019

(65) Prior Publication Data

US 2020/0091963 A1 Mar. 19, 2020

(30) Foreign Application Priority Data

Sep. 13, 2018 (DE) .................. 10 2018 122 438

(51) Int. Cl.
*H04B 3/23* (2006.01)
*G10K 11/178* (2006.01)
*H04M 9/08* (2006.01)
*H04M 3/00* (2006.01)

(52) U.S. Cl.
CPC ........... *H04B 3/237* (2013.01); *G10K 11/178* (2013.01); *H04B 3/231* (2013.01); *H04B 3/235* (2013.01); *H04M 3/002* (2013.01); *H04M 9/082* (2013.01)

(58) Field of Classification Search
CPC ...... G10K 11/178; H04B 3/231; H04B 3/235; H04B 3/237; H04M 3/002; H04M 9/082

USPC .................................................. 379/406.08
See application file for complete search history.

(56) References Cited

U.S. PATENT DOCUMENTS

| | | | | |
|---|---|---|---|---|
| 5,526,426 A | * | 6/1996 | McLaughlin | H04M 9/082 370/290 |
| 7,333,605 B1 | * | 2/2008 | Zhang | H04M 9/082 370/286 |
| 2006/0188089 A1 | * | 8/2006 | Diethorn | H04M 9/082 379/406.01 |
| 2007/0133786 A1 | * | 6/2007 | Schulz | H04B 3/23 379/406.01 |

(Continued)

FOREIGN PATENT DOCUMENTS

| | | |
|---|---|---|
| DE | 10030548 A1 | 1/2002 |
| DE | 69908463 T2 | 5/2004 |
| WO | 2004014055 A1 | 2/2004 |

*Primary Examiner* — Hemant S Patel
(74) *Attorney, Agent, or Firm* — Angela M. Brunetti

(57) ABSTRACT

Acoustic echo cancelling includes receiving a source signal and a sink signal; providing a first error signal representative of an echo-free residual signal based on a first set of coefficients based on the source signal and the sink signal, the first error signal forming an output signal of the controller; providing a second error signal based on a second set of coefficients based on the source signal and the sink signal; detecting a room change if the evaluated first second error signal is greater than a sum or product of the evaluated second first error signal and a first threshold; copying one of sets of reference coefficients stored in a memory to the second acoustic echo canceller; and copying the first set of coefficients from the first acoustic echo canceller as a set of reference coefficients into at least one of the second acoustic echo canceller and the memory.

32 Claims, 11 Drawing Sheets

(56) References Cited

U.S. PATENT DOCUMENTS

2007/0286404 A1* 12/2007 Popovic ................ H04B 3/237
                                                        379/406.01
2011/0170683 A1*  7/2011 Lu ........................ H04M 9/082
                                                        379/406.01

* cited by examiner

ACOUSTIC ECHO CANCELLATION WITH ROOM CHANGE DETECTION

CROSS REFERENCE

Priority is claimed to application serial No. 102018122438.9, filed Sep. 13, 2018 in Germany, the disclosure of which is incorporated in its entirety by reference.

BACKGROUND

1. Technical Field

The disclosure relates to an acoustic echo cancelling controller and a method for acoustic echo cancelling.

2. Related Art

Acoustic echo cancellation removes an echo captured by a microphone when a sound is simultaneously played through loudspeakers located in the vicinity of the microphone. In echo cancellation, complex algorithmic procedures may be used to compute speech echo models. This involves generating the sum of reflected echoes of an original speech and then subtracting this from any signal the microphone picks up. The result is the purified speech of a person talking. The format of this echo prediction must be learned by an echo canceller in a process known as adaptation. The performance of an adaptive filtering algorithm employed in the echo canceller can be evaluated based on its convergence rate and a factor known as misadjustment.

The rate of convergence can be defined as the number of iterations required for the algorithm, under stationary conditions, to converge "close enough" to an optimum solution. Misadjustment describes the steady-state behavior of the algorithm, and is a quantitative measure of the amount by which the averaged final value of the mean-squared error exceeds the minimum mean-squared error produced by an optimal Wiener filter. A well known property of adaptive filtering algorithms is the trade-off between adaptation time and misadjustment. An effective acoustic echo canceller requires fast adaptation when the echo path changes and smooth adaptation when the echo path is stationary.

SUMMARY

An example acoustic echo cancelling controller is configured to receive a source signal representative of sound broadcast at a first position in a room and a sink signal representative of sound picked up at a second position in the room, the sound picked up at the second position being transferred from the first position according to a transfer characteristic. The controller includes a first acoustic echo canceller configured to receive the source signal and the sink signal, and to model the transfer function in an adaptive manner based on a first set of coefficients, the first acoustic echo canceller being further configured to provide a first error signal representative of an echo-free residual signal, the first error signal forming an output signal of the controller; and a second acoustic echo canceller configured to receive the source signal and the sink signal, and to model the transfer function in a non-adaptive manner based on a second set of coefficients, the second acoustic echo canceller being further configured to provide a second error signal. The controller further includes a memory operatively coupled with the first acoustic echo canceller and the second acoustic canceller, the memory configured to store sets of coefficients from the first acoustic echo canceller as sets of reference coefficients and to provide stored sets of reference coefficients to the 20 second acoustic echo canceller; and a room change detector operatively coupled with the first acoustic echo canceller and the second acoustic echo canceller. The room change detector is configured to: evaluate the first error signal and the second error signal, and detect a room change if the evaluated first second error signal is greater than a sum or product of the evaluated second first error signal and a first threshold, to set for a predetermined period of time the first second set of coefficients equal to the second first set of coefficients if a room change is newly detected, and to copy one of the sets of reference coefficients from the memory to the second acoustic echo canceller and copy the first set of coefficients from the first acoustic echo canceller as another set of reference coefficients into at least one of the second acoustic echo canceller and the memory if a room change is still detected.

An example acoustic echo cancelling method includes receiving a source signal representative of sound broadcast at a first position in a room and a sink signal representative of sound picked up at a second position in the room, the sound being picked up at the second position being transferred from the first position according to a transfer characteristic; first acoustic echo cancelling to model the transfer function in an adaptive manner based on a first set of coefficients based on the source signal and the sink signal to provide a first error signal representative of an echo-free residual signal, the first error signal forming an output signal of the controller; and second acoustic echo cancelling to model the transfer function in a non-adaptive manner based on a second set of coefficients based on the source signal and the sink signal to provide a second error signal. The method further includes evaluating the first error signal and the second error signal and detecting a room change if the evaluated first second error signal is greater than a sum or product of the evaluated second first error signal and a first threshold; setting, for a predetermined period of time, the first second set of coefficients equal to the second first set of coefficients if a room change is newly detected; copying one of sets of reference coefficients stored in a memory to the second acoustic echo canceller; and copying the first set of coefficients from the first acoustic echo canceller as a set of reference coefficients into at least one of the second acoustic echo canceller and the memory if a room change is still detected.

Other systems, methods, features and advantages will be, or will become, apparent to one with skill in the art upon examination of the following detailed description and appended figures.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
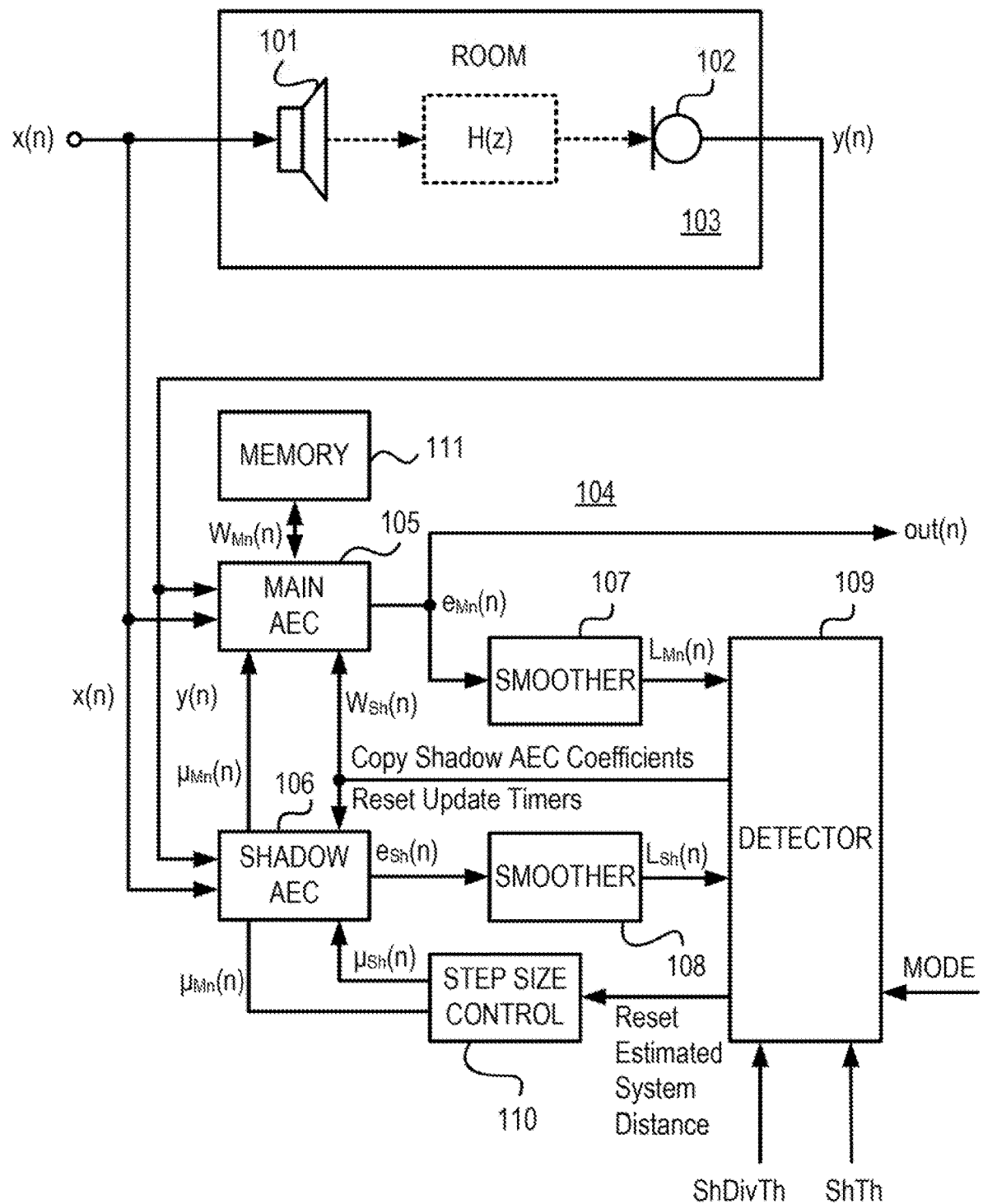
FIG. 1 is a schematic diagram illustrating an exemplary arrangement with one loudspeaker, one microphone and a single-channel acoustic echo controller including a main acoustic echo canceller and a shadow acoustic echo canceller, wherein the shadow acoustic echo canceller has a step size that is greater than that of the main acoustic echo canceller.

In the systems described herein, one or more sets of reference acoustic echo cancelling (AEC) data such as (filter) coefficients for a microphone containing device such as speech recognition devices or hands-free communication devices are stored in a memory. The stored data may be applied to the device for different modes of operation, speaker-based beam steering angles and the like in order to avoid, for example, lengthy periods of unresponsiveness to voice commands if the device is relocated in a room or placed in a different room. In any room, at least one of a blocking object and deflecting object is placed in the vicinity of the device, defining a specific acoustic situation. The acoustic situation changes when at least one of following occurs: the device is relocated in the same room, the device is moved to a different room, and the blocking and reflecting objects' positions change.

If a hard, i.e., permanent, room change is detected, all sets of the AEC reference data may be replaced by new ones, reflecting the new acoustical situation. This can be done, for example, by resetting an update timer (e.g., counter) and/or controlling storage of a current AEC coefficient set that corresponds to the current mode of operation saved in the memory, while leaving the stored AEC filter coefficient sets unchanged. Compared to other concepts, such as resetting all AEC filter coefficients to zero, the concept outlined above preserves the AEC filter coefficients if a hard room change is erroneously detected.

Usually, the device stays at the same location in the same room, utilizing only a limited number of modes of operations. Hence, the AEC reference data do not change significantly and there is no need to update them rapidly and on a regular basis. Thus, an exponentially expanding time between updates may be employed to ensure quick updating at the beginning when the instant mode of operation has not been previously serviced in order to reduce the number of (read and/or write) accesses to the memory, allowing only a limited number of accesses over its lifetime. As an example, the exponentially increasing time periods between updates may include 1, 3, 5, 10, 50, 100 seconds up to a maximum update time of, e.g., 12 hours, which means that, if the acoustic situation does not change for a long time, the AEC filter coefficients are updated only twice a day. Each mode of operation, speaker-based beam steering angle, etc. may have its own dedicated logarithmic update timer. If a hard room change is detected, all update timers are reset to the respective initial value, which may be 1 second as in the example described above. For this, however, it is a necessary to definitively detect a hard room change.

Besides hard. i.e., permanent, room changes, soft, i.e., temporary room changes may be considered. Soft room changes may be generated by a person moving in the room and eventually approaching the device, a person operating the device (e.g. manually changing the volume of the device), a cup of coffee casually placed close to the device, and so on. Those types of room changes can be addressed, for example, by way of shadow filters, which will be described below.

Referring to FIG. 1, an exemplary simple acoustic situation may be established by a loudspeaker 101 and a microphone 102, which are disposed in a room 103. The acoustic situation (also referred to as room impulse response) including blocking and deflecting effects elicited by and occurring in the room 103 can be described for this particular loudspeaker-room-microphone system by a transfer function H(z), which describes the alteration of sound when travelling from the loudspeaker 101 to the microphone 102 in the room 103. An electrical source signal x(n) representative of sound broadcasted by the loudspeaker 101 and an electrical sink signal y(n) representative of sound picked up by the microphone 102 are supplied to an AEC controller 104.

In the AEC controller 104, both the source signal x(n) and the sink signal y(n) are supplied to a first AEC canceller, herein also referred to as main AEC filter 105, and a second AEC canceller, herein also referred to as shadow AEC filter 106. The shadow AEC filter 106 is operated in parallel with the main AEC filter 105 at a (much) higher adaptation step size $\mu_{Sh}(e^{j\Omega}, n)$ than an adaptation step size $\mu_{Mn}(e^{j\Omega}, n)$ of the main AEC filter 105. Adaptation step size, also known as adaptive step size and represented by an adaptation (or adaptive) step size parameter μ, controls in an adaptive filter the rate of convergence (referred to as convergence rate) of the filter. The adaptation step size parameter μ is a critical parameter that impacts the performance of the adaptive filter. The adaptation step size parameter μ is typically defined prior to operation of the adaptive filter or varied in a deterministic way. The step size is the size of each step in an iterative (loop) algorithm that attempts to converge to some point, such as least mean square (LMS) or its derivatives. Large adaptation step sizes help the adaptive filter converge (in an accurate manner as is possible) in a short period of time, but the adaptive filter converges more accurately if the adaptation step size is smaller. Thus, there is a trade-off between fast and accurate convergence. The ideal balance between convergence speed and accuracy depends on how fast the point on which the algorithm is trying to converge to changes. The convergence time is inversely related to the adaptation step size parameter μ. Therefore, with a larger step size, the convergence can be obtained faster.

The main AEC filter 105 outputs an error signal $e_{Mn}(n)$, which is also used as (single) output signal out(n) of the AEC controller 104, and the shadow AEC filter 106 outputs an error signal $e_{Sh}(n)$. By evaluating, for example, the (energies or) levels $L_{Sh}(n)$ and $L_{Mn}(n)$ of the error signals $e_{Mn}(n)$ and $e_{Sh}(n)$, the main AEC filter 105 and the shadow AEC filter 106 can be used to detect (soft) room changes. A room change may be detected, for example, if the level $L_{Mn}(n)$ exceeds the level $L_{Sh}(n)$ by a predetermined value or factor, e.g., represented by a level threshold ShTh. The level of each of error signals $e_{Mn}(n)$ and $e_{Sh}(n)$ may be determined by a smoothing filter 107 from the error signal $e_{Mn}(n)$ and by a smoothing filter 108 from the error signal $e_{Sh}(n)$. Alternatively, the powers of the error signals $e_{Mn}(n)$ and $e_{Sh}(n)$ may be used. The levels $L_{Sh}(n)$ and $L_{Mn}(n)$ of the error signals $e_{Mn}(n)$ and $e_{Sh}(n)$ are supplied to a detector 109. The detector 109, which also receives the predetermined level threshold ShTh and a predetermined divergence threshold ShDivTh, controls the main AEC filter 105 and the shadow AEC filter 106, for example, to copy filter coefficients of the shadow AEC filter 106 into the main AEC filter 105, and to reset the update timers in the main AEC filter 105 and the shadow AEC filter 106. If a room change is detected by the detector 109, the coefficients of the faster adapting AEC filter, which is the shadow AEC filter 106, are copied into the slower but more accurately adapting AEC filter, which is the main AEC filter 105, if certain conditions are fulfilled, as described in more detail below in connection with FIG. 3. Thus, also the main AEC filter 105 adapts faster in the event of room changes without unintendedly entering into an undesired freeze state.

The detector 109 may further control the adaptation step sizes $\mu_{Mn}(e^{j\Omega}, n)$ and $\mu_{Sh}(e^{j\Omega}, n)$ of the main AEC filter 105 and the shadow AEC filter 106 via a step size controller 110 which may adjust the step sizes according various acoustic situations and may reset the step sizes (in accordance with an estimated system distance). The main AEC filter 105 may be further connected to a memory 111, which may be integrated in the AEC controller 104 as shown or be operatively coupled as a separate device with the AEC controller 104. For specific acoustic situations, coefficients $W_{Mn}(n)$ of the main AEC filer 105 may be copied into the memory 111 as sets of reference acoustic echo cancelling (AEC) data. The detector 109 further receives a mode control signal MODE which allows for switching between different modes of operation in which different predetermined coefficient sets are copied to or from at least one of the main AEC filter 105 and the shadow AEC filter 106.

Figure 2:
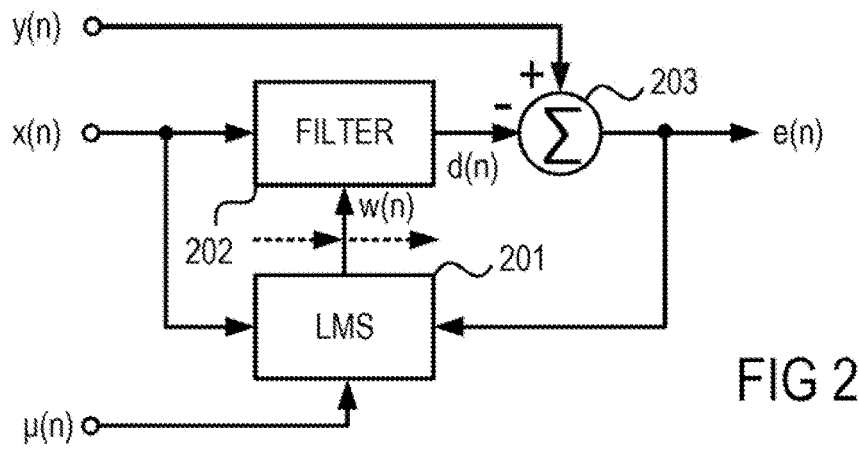
FIG. 2 is a schematic diagram illustrating an exemplary single-channel acoustic echo canceller applicable in the acoustic echo controller shown in FIG. 1.

In an exemplary AEC filter shown in FIG. 2, which can be applied as either of AEC filters 105 and 106 in the AEC controller 104 shown in FIG. 1, the sound transmission between the loudspeaker 101 and the microphone 102 (the transfer function H(z)) is modeled. The acoustic echo of the sound broadcasted by the loudspeaker 101 is picked up by the microphone 102 and transformed into electrical sink signal y(n) which can be seen as a convolution of the source signal x(n) with this transfer function (room impulse response) H(z). The adaptive AEC filter, which includes an update controller 201 (correlation part) and a controllable filter 202 (convolution part) in connection with a subtractor 203, models with its transfer function the real transfer function H(z) between loudspeaker 101 and microphone 102. The controllable filter 202 may be a Finite Impulse Response (FIR) filter whose filter coefficients or filter weights w(n) are updated by the update controller 201 with a predetermined step size μ(n) by correlating an echo-free residual signal, error signal e(n), with the source signal x(n). By convolving the input signal x(n) with the filter coefficients w(n) in the controllable filter 202, the adaptive filter estimates the unknown acoustic echo, indicated by the estimated echo signal d(n) which is output by controllable filter 202. This estimate of the acoustic echo, estimated echo signal d(n), is subtracted from the sink signal y(n), which is representative of the real echo, by way of subtractor 203 to provide the echo-free residual signal, herein referred to as error signal e(n). Error signal e(n) is also indicative of how accurate/inaccurate the estimation is. As indicated by dotted lines in FIG. 2, the coefficients w(n) may be copied from any memory (not shown) into the update controller 201/controllable filter 202 or from the update controller 201/controllable filter 202 into any memory (not shown).

For efficient implementations of adaptive filters, fast convolution (filtering) may be performed with block signal processing in combination with Fast Fourier Transform (FFT), which permits adaptation of filter parameters in the frequency domain in a computationally efficient manner. To do this, a block of input samples is collected and the adaptive filtering is performed in frequency domain. Commonly, Fast Fourier Transform (FFT) is used to calculate frequency domain data from time-domain data although it is noted that also other transforms can be used for this purpose.

Figure 3:
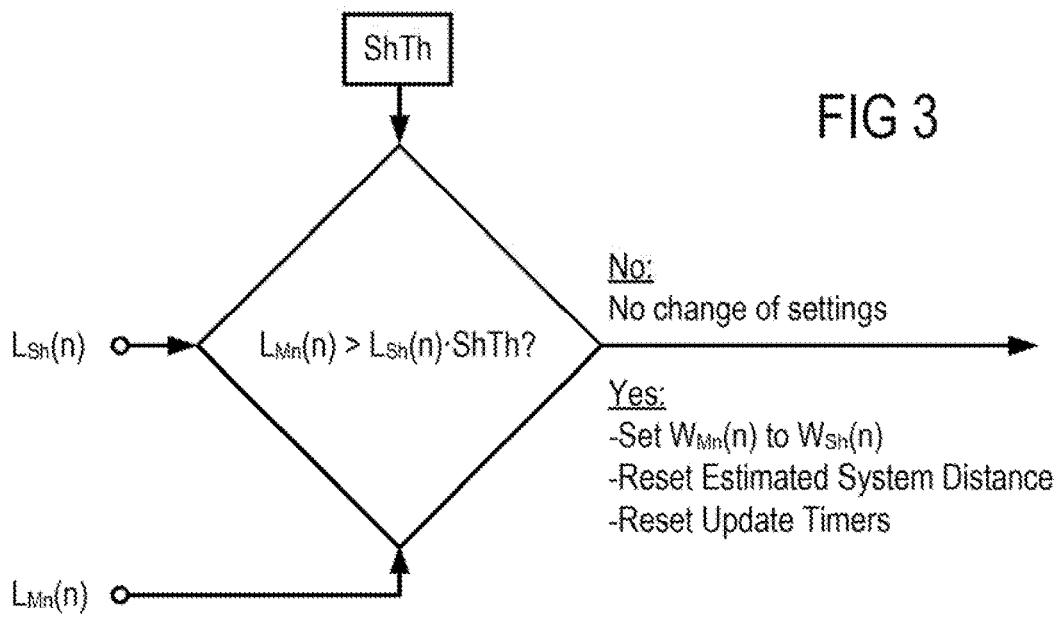
FIG. 3 is a flow diagram illustrating an exemplary room change detection procedure implemented in the acoustic echo controller shown in FIG. 1.

Referring to FIG. 3, the detector 109 shown in and described in connection with FIG. 1 receives levels $L_{Sh}(n)$ and $L_{Mn}(n)$ of the error signals $e_{Sh}(n)$ and $e_{Mn}(n)$ and the predetermined level threshold ShTh and controls the main AEC filter 105 and the shadow AEC filter 106 to copy the filter coefficients of the shadow AEC filter 106 into the main AEC filter 105 if a room change is detected by the detector 109. A room change may be detected by comparing the level $L_{Mn}(n)$ with the product of level $L_{Sh}(n)$ and the predetermined level threshold ShTh. If the level $L_{Mn}(n)$ exceeds the product of level $L_{Sh}(n)$ and the predetermined level threshold ShTh, the coefficients $W_{Mn}(n)$ of the main AEC filter 105 are set for one sample or a few samples equal to the coefficients $W_{Sh}(n)$ of the shadow AEC filter 106. Otherwise, no such settings are made. In addition to temporarily replacing the main AEC filter coefficients $W_{Mn}(n)$ by the shadow AEC filter coefficients $W_{Sh}(n)$, the detector 109 may reset an estimated system distance (e.g., by setting it to a value of 1) supplied to the step size control 110, in order to avoid undesired freezing conditions of the main AEC filter 105, and/or may reset update timers in the main AEC filter 105 and the shadow AEC filter 106.

Figure 4:
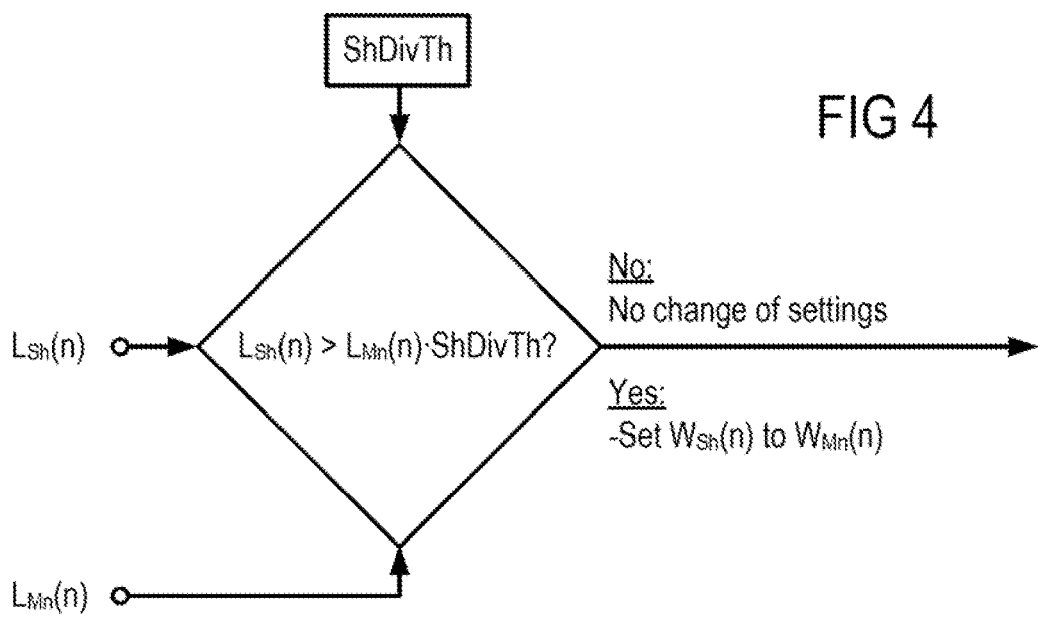
FIG. 4 is a flow diagram illustrating an exemplary procedure for detecting divergence of the shadow filter, which is implemented in the acoustic echo controller shown in FIG. 1.

Optionally, the detector 109 may receive a predetermined divergence threshold ShDivTh and compare the level $L_{Sh}(n)$ with the product of level $L_{Mn}(n)$ and the divergence threshold ShDivTh as shown in FIG. 4. If the level $L_{Sh}(n)$ exceeds the product of level $L_{Mn}(n)$ and the predetermined divergence threshold ShDivTh, the coefficients $W_{Sh}(n)$ of the shadow AEC filter 106 are, for one sample or a few samples, the coefficients $W_{Mn}(n)$ of the main AEC filter 105. Otherwise, no such settings are made. Due to the fact that the adaptation step size of the shadow-filter is (much) higher than that of the main filter, whose adaptation step size is designed for maximum stability under all possible circumstances, the shadow AEC filter may occasionally become instable. If instability is detected, e.g., in a manner shown in and disclosed in connection with FIG. 4 based on the divergence threshold ShDivTh, the filter coefficients $W_{Sh}(n)$ of the shadow AEC filter 106 are replaced by the filter coefficients $W_{Mn}(n)$ of the main AEC filter 105 to ensure the stability of the shadow AEC filter 106 despite its (very) large adaptation step size.

Figure 5:
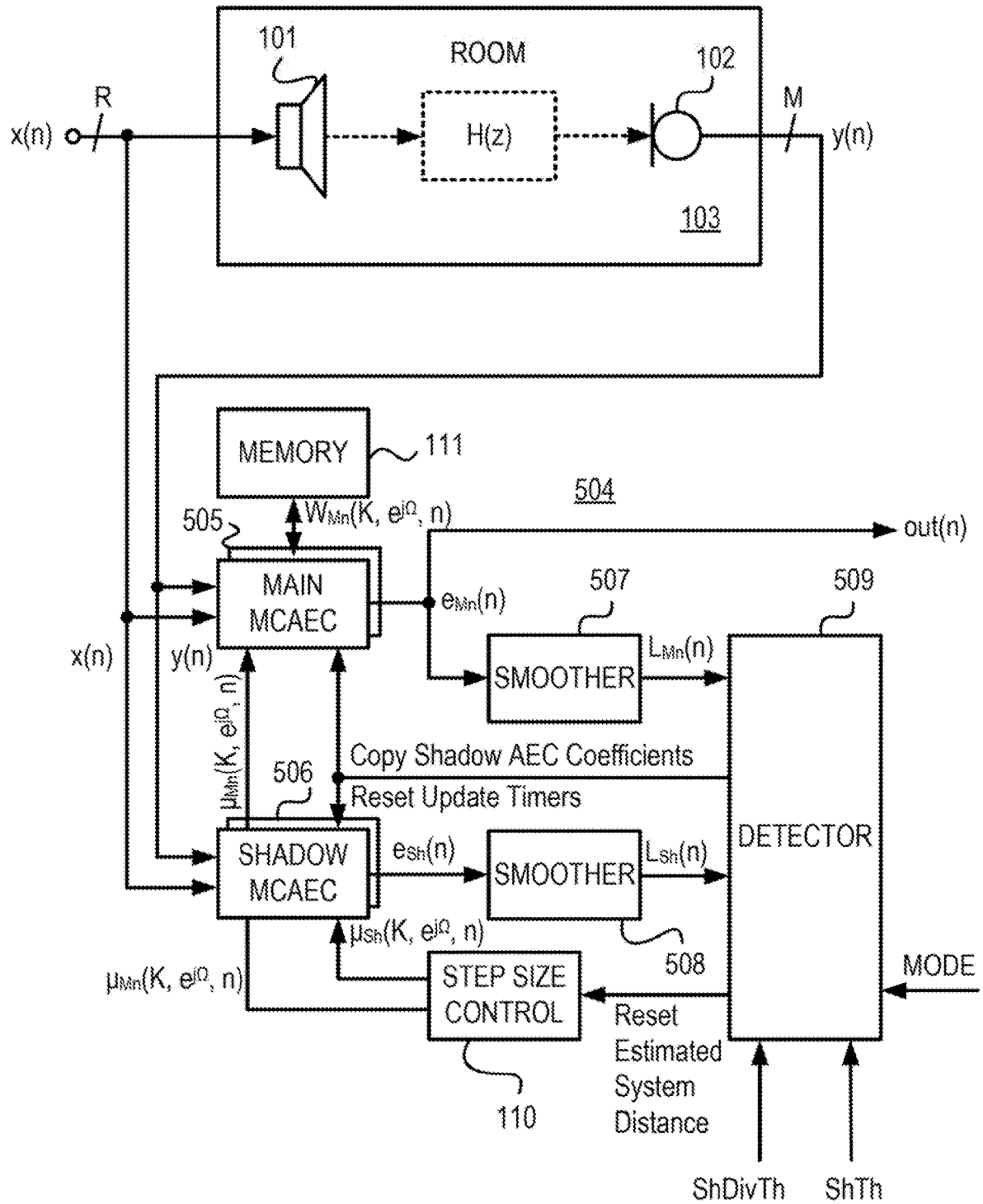
FIG. 5 is a schematic diagram illustrating an exemplary arrangement with multiple loudspeakers, multiple microphones and a multi-channel acoustic echo controller that includes partitioned main and shadow acoustic cancellers.

Instead of a single channel, not-partitioned structure of an AEC controller 104 as shown in and described in connection with FIG. 1, a multi-channel and/or partitioned structure may be employed. FIG. 5 shows an exemplary AEC controller 504 with a partitioned, multi-channel AEC (MCAEC) structure which is based on the structure of the AEC controller 104. Instead of one source signal x(n), R≥1 source signals x(n), and instead of one sink signal y(n), M≥1 sink signals y(n) are supplied to the AEC controller 504. R source signals x(n) may correspond with R loudspeakers (or group of loudspeakers) and M sink signals may correspond with M microphones (or group of microphones). As a result R×M transfer functions between the R loudspeakers and M microphones may occur in room 103. However, for the sake of simplicity only one loudspeaker 101 and one microphone 102 are shown in FIG. 5.

To each of the R×M transfer functions, a separate channel of the main MCAEC filter 505, which replaces single-channel main AEC filter 105, and a separate channel of the shadow MCAEC filter 506, which replaces single-channel shadow AEC filter 105, are dedicated. The number of channels may apply also to two smoothing filters 507 and 508 which replace single-channel smoothing filters 107 and 108 shown in FIG. 1. The R×M transfer functions occurring between the R loudspeakers and M microphones in the room 103 are modeled by R×M transfer functions $W_{Mn}(K, e^{j\Omega}, n)$ of the main MCAEC filter 505, wherein K denotes the channel number and $e^{j\Omega}$ the complex frequency, and similarly in the background by R×M transfer functions of the shadow MCAEC filter 506. Each channel of the main MCAEC filter 505 and the shadow MCAEC filter 506 has its separate step size $\mu_{Mn}(K, e^{j\Omega}, n)$ and $\mu_{Sh}(K, e^{j\Omega}, n)$, respectively.

A partitioned AEC or MCAEC filter (indicated by a stacked illustration in the figures) can be described, for example, as a partitioned block frequency domain adaptive filter for filtering an input signal (here the source signal) dependent on a control signal (here the sink signal). Such adaptive filter comprises a plurality of filter partitions (per channel) operated in parallel, in which each filter partition is designed to model a part of a transfer function (impulse response) of the adaptive filter. Each filter partition may have an update mechanism for updating filter coefficients of that filter partition by circular convoluting a signal representative of the source signal and a signal representative of the sink signal. The update mechanism includes constraint means for intermittently constraining the filter coefficients by eliminating circular wrap-around artifacts of the circular convolution.

Figure 6:
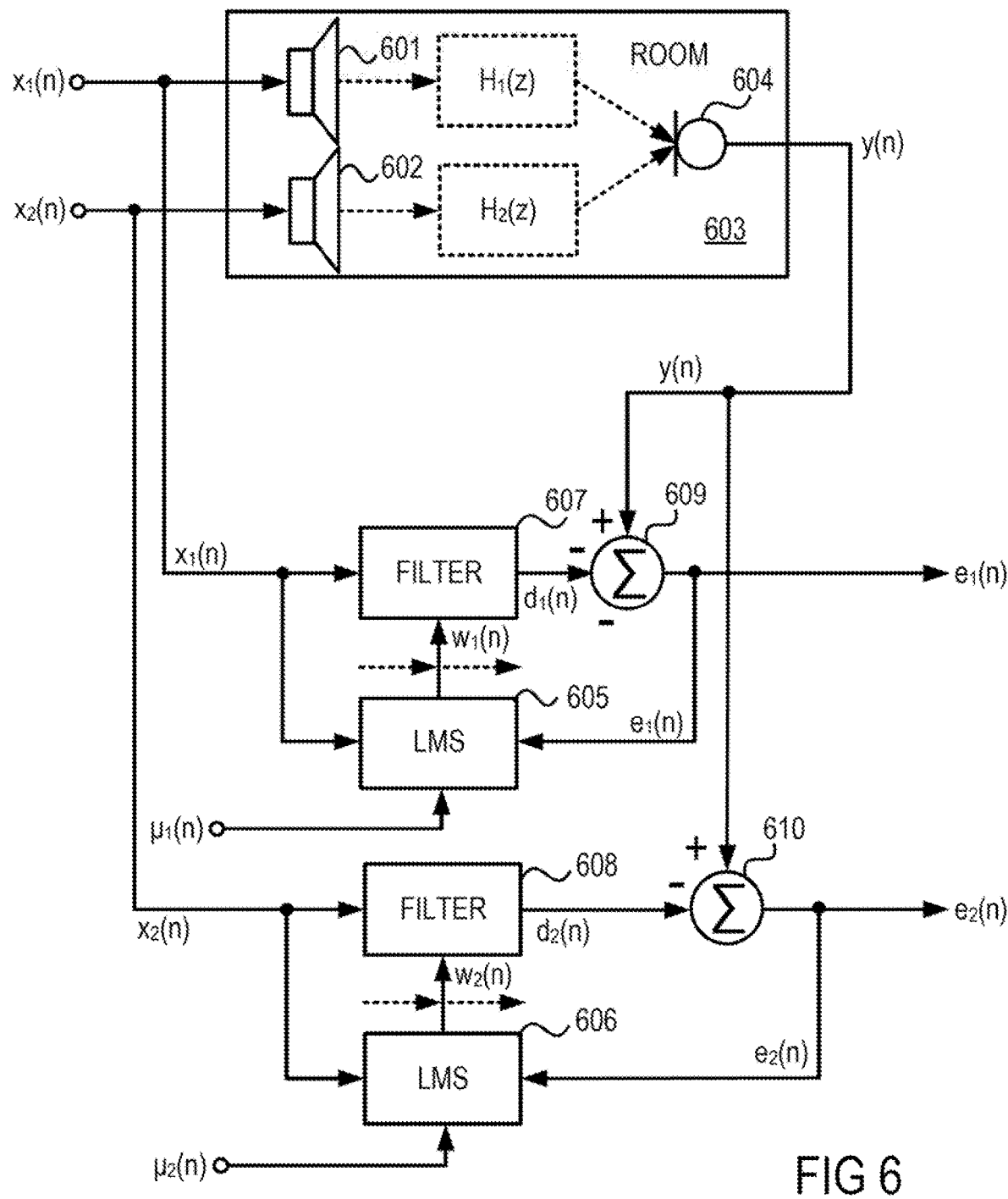
FIG. 6 is a schematic diagram illustrating an exemplary multi-channel acoustic echo canceller applicable in the acoustic echo controller shown in FIG. 5.

FIG. 6 illustrates an exemplary MCAEC filter with R×M channels, wherein R=2 and M=1, and thus the number of channels=2 in the example shown. These channels may receive two (stereo) source signals $x_1(n)$ and $x_2(n)$ which are further supplied to two loudspeakers 601 and 602 in a room 603. A microphone 604 picks up sound that is transferred to it from the loudspeaker 601 according to a transfer function $H_1(z)$ and from loudspeaker 602 according to a transfer function $H_2(z)$. In the exemplary MCAEC filter shown in FIG. 6, which can be applied as either of multi-channel AEC filters 505 and 506 of the AEC controller 504 shown in FIG. 5, the sound transmission between loudspeaker 601, 602 and the microphone 604 is modeled, i.e., the transfer functions $H_1(z)$ and $H_2(z)$. The acoustic echo of the two source signals $x_1(n)$ and $x_2(n)$ broadcasted by loudspeakers 601 and 602 is picked up by the microphone 604 and transformed into the single electrical sink signal y(n) which can be seen as sum of the convolutions of the source signals $x_1(n)$, $x_2(n)$ with the respective transfer function $H_1(z)$, $H_2(z)$. The adaptive MCAEC filter, which includes two update controllers 605, 606 and two corresponding controllable filters 607, 608 in connection with two corresponding subtractors 609, 610, models with its two transfer functions the real transfer functions $H_1(z)$ and $H_2(z)$. The controllable filters 607, 608 may be Finite Impulse Response (FIR) filters whose filter coefficients or filter weights $w_1(n)$, $w_2(n)$ are updated by the corresponding update controllers 605, 606 with predetermined step sizes $\mu_1(n)$, $\mu_2(n)$ by correlating corresponding error signals $e_1(n)$, $e_2(n)$, with the respective source signals $x_1(n)$, $x_2(n)$. By convolving the input signal x(n) with the filter coefficients $w_1(n)$, $w_2(n)$ in the controllable filter 607, 608, the multi-channel adaptive filter estimates the unknown acoustic echo, indicated by the estimated echo signals signal $d_1(n)$, $d_2(n)$ which is output by controllable filter 607, 608. These estimates of the acoustic echoes, estimated echo signals $d_1(n)$, $d_2(n)$, are each subtracted from the sink signal y(n), which is representative of the real echoes, by way of the subtractors 609, 610 to provide the error signal $e_1(n)$, $e_2(n)$ which are indicative of how accurate/inaccurate the respective estimations are. As indicated by dotted lines in FIG. 2, the coefficients $w_1(n)$, $w_2(n)$ may be copied from any memory (not shown) into the update controllers/controllable filters or from the update controllers/controllable filters into any memory (not shown).

Figure 7:
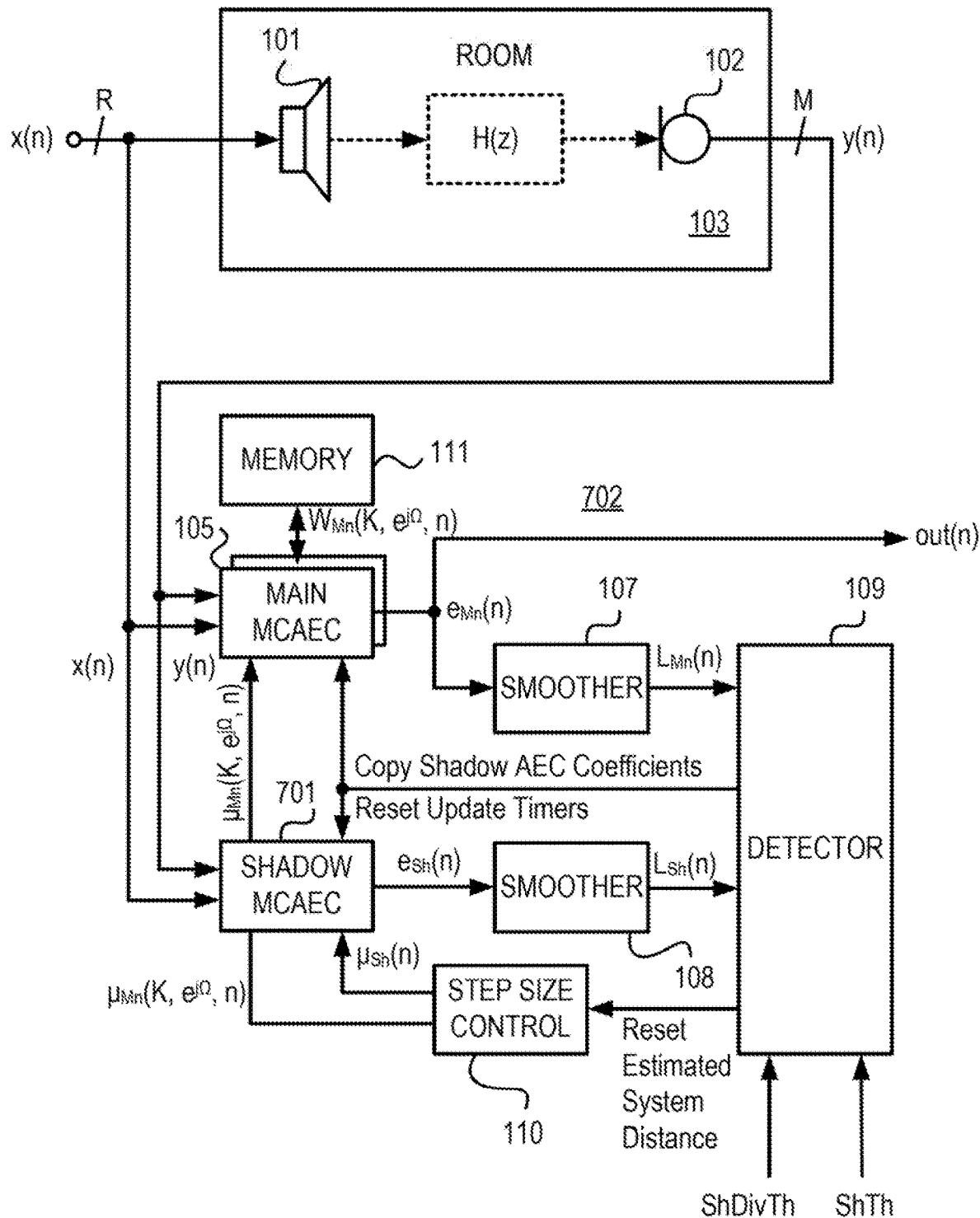
FIG. 7 is a schematic diagram illustrating an exemplary arrangement with multiple loudspeakers, multiple microphones and a multi-channel acoustic echo controller that includes shadow acoustic cancellers and partitioned main acoustic cancellers.

The controller 504 shown in FIG. 5 may be modified by replacing the partitioned shadow MCAEC filter 506 by a non-partitioned or partitioned with only one partition (one-partition) shadow MCAEC filter 701 as shown as controller 702 in FIG. 7. Except for the shadow AEC filter 701 and its step size, which is here a single step size $\mu_{Sh}(n)$, the remaining parts of controller 702 are identical with the corresponding parts of controller 504. AEC systems, if implemented in the spectral domain, may be partitioned in order to reduce latency. A partitioned framework allows to reduce the effort for room detection, e.g., in the shadow filter, as most of the operations may not always be performed for all partitions. Most of the time the processing of a reduced number of partitions, or even only one partition, e.g., the first partition, is sufficient, resulting in a much more efficient (soft) room detection.

Figure 8:
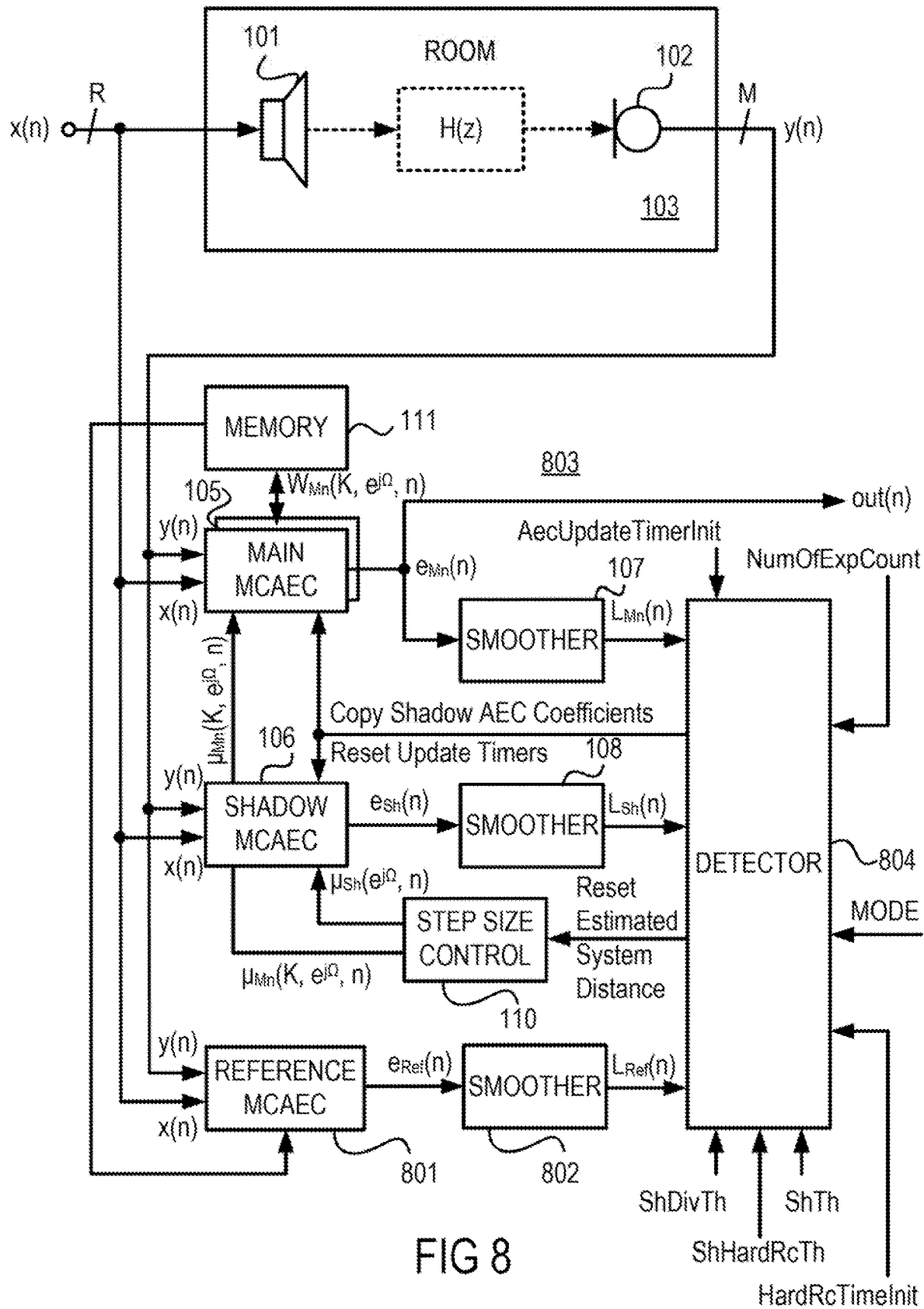
FIG. 8 is a schematic diagram illustrating an exemplary arrangement with multiple loudspeakers, multiple microphones and a multi-channel acoustic echo controller that includes a shadow acoustic canceller, reference acoustic canceller and partitioned main acoustic canceller.

The controller 504 shown in FIG. 5 may be modified to form a controller 803 shown in FIG. 8 by adding a partitioned, non-adaptive reference MCAEC filter 801 and a smoother 802. The detector 509 is modified to form a detector 804 which further receives additional signals AccUpdateTimerInit, which represents an initialization value for an update timer, NumOfExpCount, which represents the number of expired counters (timers), HardRcTimeInit, which represents an initialization value for a hard room change timer, and ShHardRcTh, which represents a threshold for a hard room change detection. The remaining parts of controller 803 are identical with the corresponding parts of controller 504. Partitioned reference MCAEC filter 801 receives the R source signals x(n) and the M sink signals y(n) and supplies echo signals $e_{Ref}(n)$ to the smoother 802 which outputs levels $L_{ref}(n)$ to the detector 804. The dedicated detection of hard room changes requires an additional ("third") signal for evaluation. Since the detection of a hard room change serves mainly to decide whether all reference AEC update timers (tinier vectors) for all possible modes of operation are to be reset, it may be desirable to also make use of an MCAEC reference filter to detect whether a hard room change occurred or not. To achieve this, in the example shown in FIG. 8, a non-adaptive structure is used to generate the desired "third signal", represented by the error signal $e_{Ref}(n)$ or a (power or) level $L_{Ref}(n)$ corresponding thereto, since this signal can easily be generated by using stored AEC filter coefficients in correspondence with the current mode of operation and in combination with the current R source signals x(n) and the M sink signals y(n).

Figure 9:
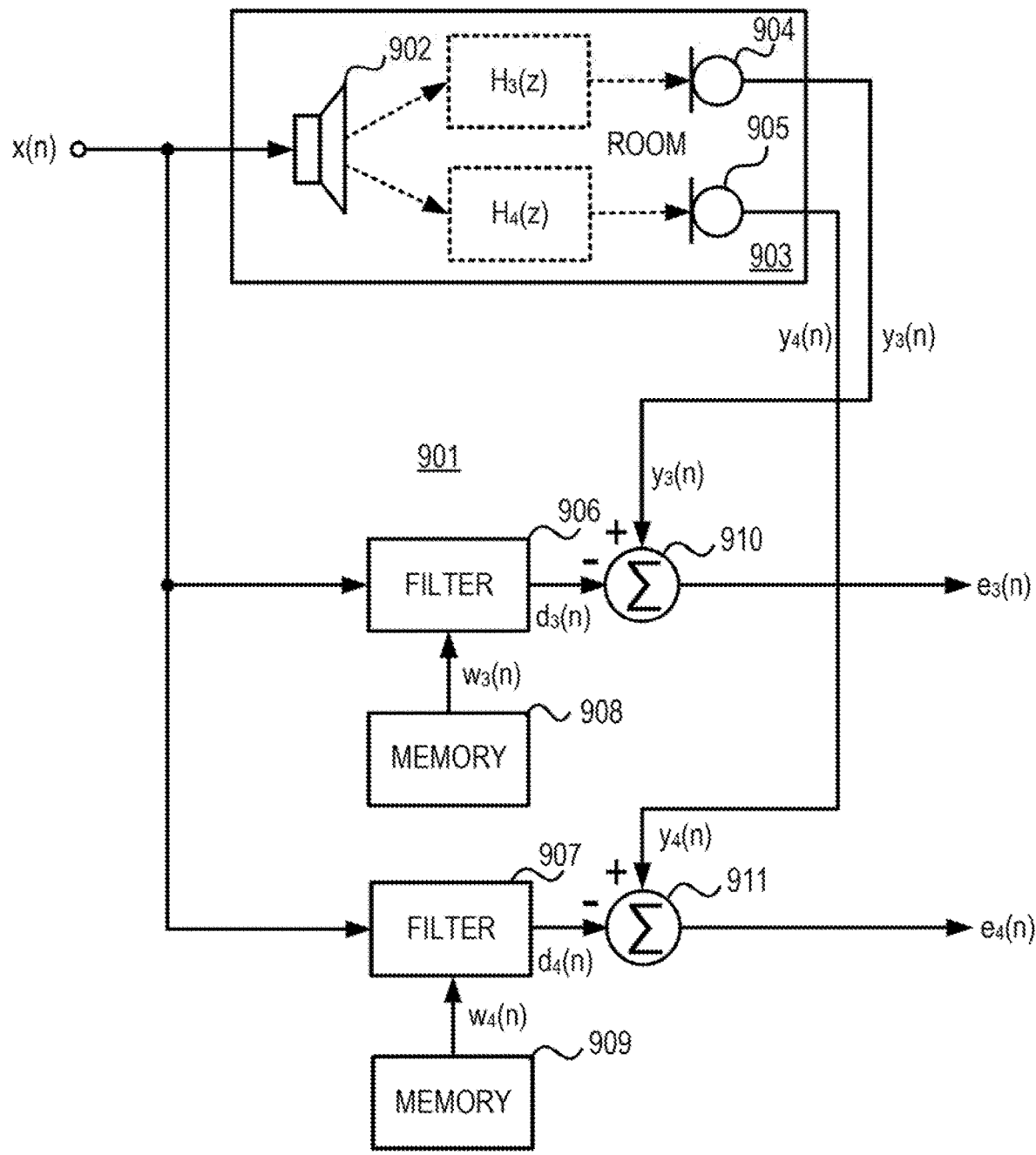
FIG. 9 is a schematic diagram illustrating an exemplary multi-channel acoustic echo canceller applicable in the reference acoustic echo canceller shown in FIG. 8.

FIG. 9 illustrates in more detail an exemplary non-adaptive (non-partitioned) MCAEC filter 901 with R=1 and M=2, i.e., one loudspeaker, two microphones and, thus, 2 channels. These two channels receive one source signal x(n) which is further supplied to a loudspeaker 902 in a room 903. Two microphones 904 and 905 pick up sound that is transferred from the loudspeaker 902 according to two transfer functions $H_3(z)$ and $H_4(z)$ to the microphones 904 and 905, respectively, and transform them into electrical sink signals $y_3(n)$, $y_4(n)$ which can be seen as the convolutions of the source signal x(n) with the transfer functions $H_3(z)$, $H_4(z)$. In the non-adaptive (non-partitioned) MCAEC filter 901, controllable filters 906, 907 receive filter coefficients or filter weights $w_3(n)$, $w_4(n)$ from one or more memories 908, 909 and provide signals $d_3(n)$, $d_4(n)$ by convolving the input signal x(n) with the filter coefficients $w_3(n)$, $w_4(n)$ to estimate the unknown acoustic echoes, indicated by the estimated echo signals signal $d_3(n)$, $d_4(n)$. This means that the controllable filters 906, 908 model the sound transmission between loudspeaker 901 and the microphones 904 and 905, i.e., the transfer functions $H_3(z)$ and $H_4(z)$. The estimates of the acoustic echoes, indicated by estimated echo signals signal $d_3(n)$, $d_4(n)$, are subtracted from the sink signals $y_3(n)$, $y_4(n)$ by way of the subtractors 910, 911 to provide error signal $e_3(n)$, $e_4(n)$ which are indicative of how accurate/inaccurate the respective estimations are.

Figure 10:
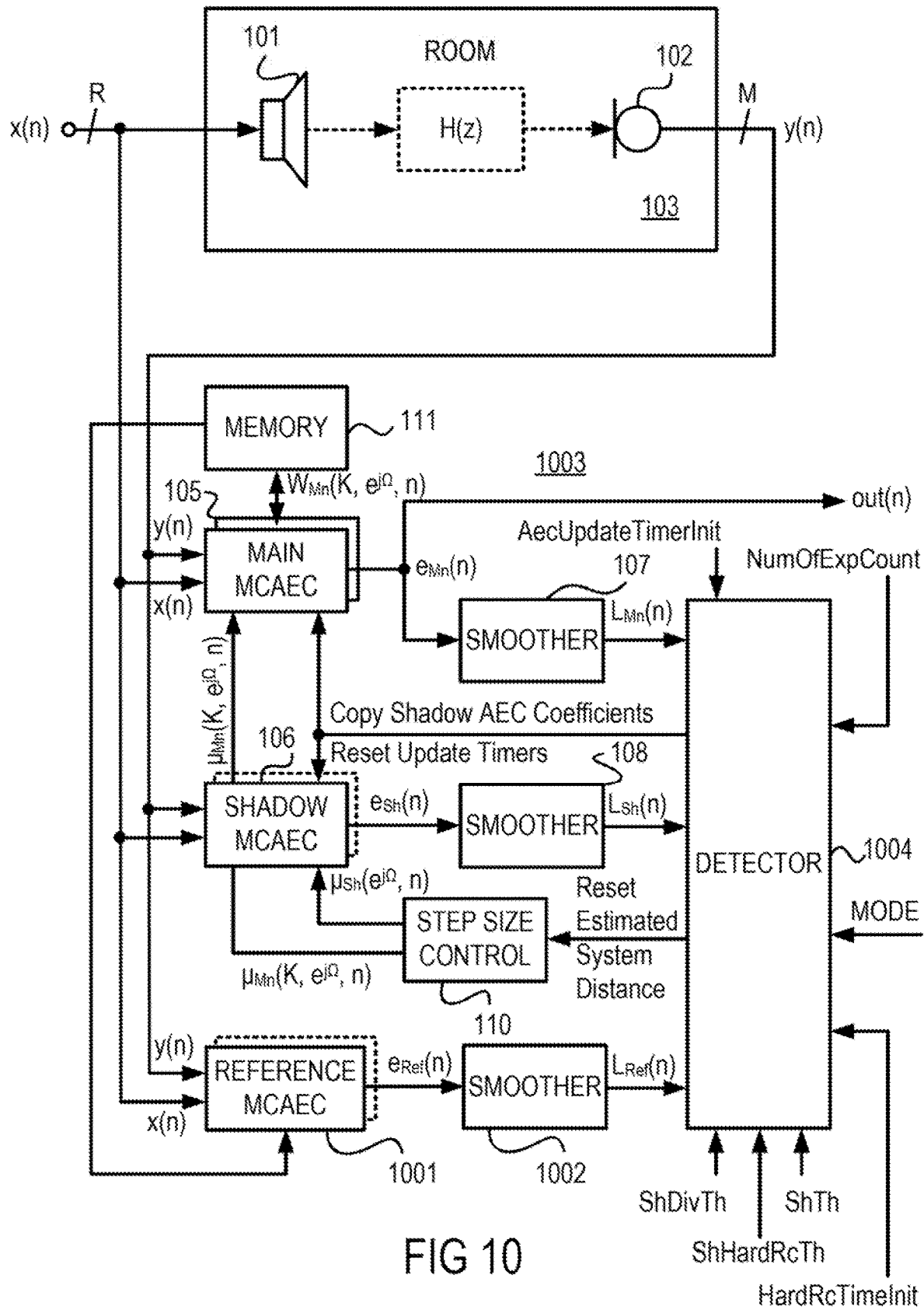
FIG. 10 is a schematic diagram illustrating an exemplary arrangement multiple loudspeakers, multiple microphones and a multi-channel acoustic echo controller that includes partitioned shadow acoustic echo cancellers, each having only one partition, reference acoustic echo cancellers, each having only one partition, and multi-partitioned main acoustic cancellers.

In another example, the controller 707 shown in FIG. 7 may be modified by adding a partitioned, non-adaptive reference MCAEC filter 1001 and a smoother 1002 as shown as controller 1003 in FIG. 10. The detector 509 is modified to form a detector 1004 which further receives the additional signals AccUpdateTimerInit, NumOfExpCount, HardRcTimeInit and ShHardRcTh. These signals are specified above in connection with FIG. 8. The remaining parts of controller 1003 are identical with the corresponding parts of controller 707. Non-partitioned, non-adaptive, reference MCAEC filter 1001 receives the R source signals x(n) and the M sink signals y(n) and supplies echo signals $e_{Ref}(n)$ to the smoother 1002 which outputs levels $L_{Ref}(n)$ to the detector 1004.

Figure 11:
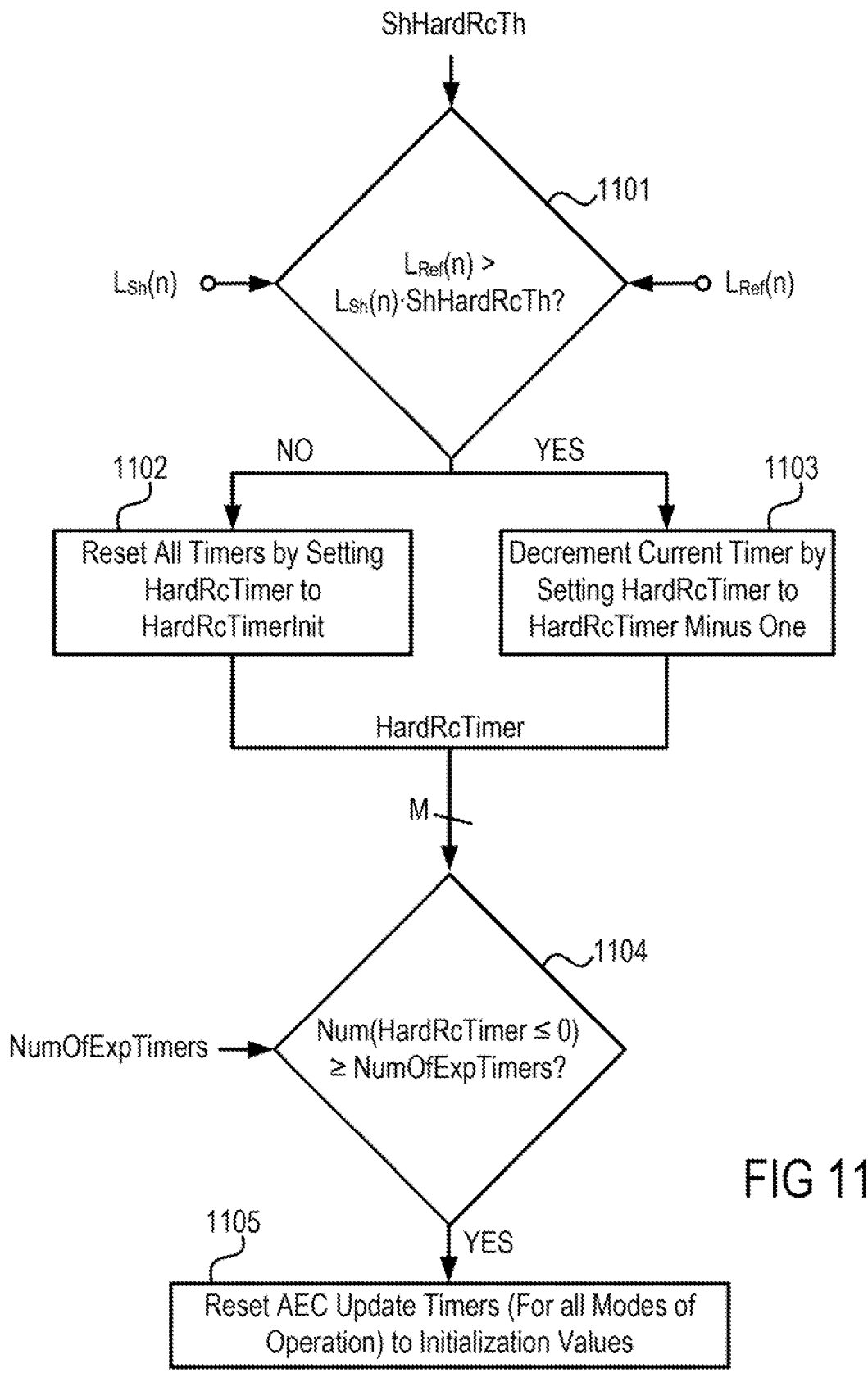
FIG. 11 is a flow diagram illustrating an exemplary hard room change detection procedure implemented in the acoustic echo controller shown in FIG. 10.

FIG. 11 shows a flowchart of a procedure of how a hard room change can be detected, for example, in the detector 1004 of AEC controller 1003 shown in FIG. 10. Assuming M=2 and R=1, for each of the m microphones, with m=1, . . . , M, respective error signals of the M shadow AEC filters, M main AEC filters and M reference AEC filters, the following steps are taken: At a first step 1101, a comparison is made as to whether the level $L_{Ref}(n)$ exceeds the product of the level $L_{Sh}(n)$ and the threshold ShHardRcTh. If this is not true (NO), a value HardRcTimer of all timers are reset to their initialization value HardRcTimerInit (step 1102). Otherwise, i.e., if it is true (YES), they are decremented, e.g., by 1 (step 1103). In a step 1104, all timers are evaluated whether they are expired or not. Particularly, it is evaluated how many timers have a value less than or equal to zero, represented by a count Num(HardRcTimer≥0). If the count of expired timers Num(Hard RcTimer≤0) exceeds a certain number given by NumOfExpTimer, which may be set, for example, to M/2, a hard room change is detected. Upon detection of a hard room change, all AEC update timers are reset to their initialization values (step 1105).

Figure 12:
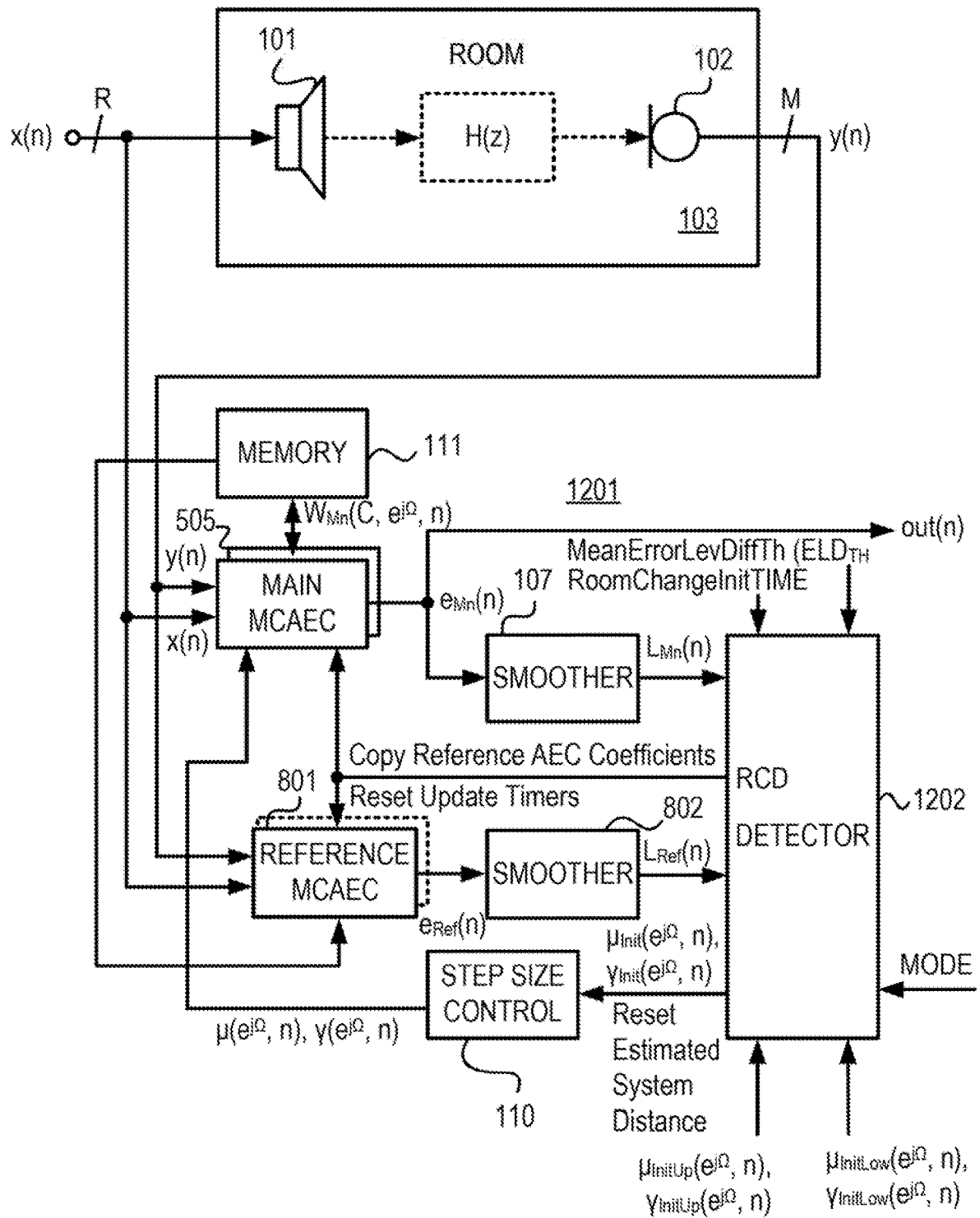
FIG. 12 is a schematic diagram illustrating an exemplary arrangement multiple loudspeakers, multiple microphones and a multi-channel acoustic echo controller that includes reference acoustic cancellers and partitioned main acoustic cancellers.

If a loudspeaker exhibits an increased total harmonic distortion in a certain frequency range and is furthermore operated in this frequency range, an AEC controller modified as described in connection with FIG. 12 may be utilized. The controller 803 shown in FIG. 8 may be modified by omitting the partitioned shadow MCAEC filter 506 and the corresponding smoother 508 as shown as controller 1201 in FIG. 12. The step size of the main MCAEC filter 505 is now controlled by two step sizes $\mu(e^{j\Omega}, n)$ and $\gamma(e^{j\Omega}, n)$ from the step size control 110 which receives a signal for resetting the estimated system distance and signals $\mu_{Init}(e^{j\Omega}, n)$, $\gamma_{Init}(e^{j\Omega}, n)$ from a detector 1202. Detector 1202 replaces detector 509 and receives control signals $\mu_{InitUp}(e^{j\Omega}, n)$, $\gamma_{InitUp}(e^{j\Omega}, n)$, $\mu_{InitLow}(e^{j\Omega}, n)$, $\gamma_{InitLow}(e^{j\Omega}, n)$, a value RoomChangeInitTime, a mean error level difference threshold $ELD_{Th}$ and the mode control signal MODE which allows also controlling copying between the reference AEC filter 801 and the memory 111 in different modes of operation. Further, detector 1202 controls the reference MCAEC filter 801 and the main MCAEC filter 505 to copy the reference AEC coefficients into the main MCAEC filter 505 if a room change is detected (RCD). Except for the modifications described before, the remaining parts of controller 1201 may be identical with the corresponding parts of controller 803. From the perspective of the controller 803, a room change inevitably affects the room impulse response(s), i.e., the transfer function(s) between the loudspeaker(s) and the microphone(s), when for example a person approaches a device that contains the microphone(s) and the loudspeaker(s) or the device is moved to another position or the like. Since the AEC controller constantly estimates the current room impulse responses, room changes may be definitively detected by analyzing in another way the difference(s) between the previously estimated room impulse response(s) and the current room impulse response(s).

As a (fully adapted) reference AEC coefficient set per mode may be available, as in the controller shown in FIG. 8, a comparison between the current estimate of the room impulse response(s) represented by the coefficient set from the main AEC filter with the stored reference AEC coefficient set is possible. One easy and efficient way to compare both sets of coefficients is to compare the two error signal levels (or powers), as already described in the above examples or, as described in connection with FIG. 12, the error signal levels from main AEC filter and reference AEC filter. In the AEC controller 1201 shown in FIG. 12, the levels of the error signals (smoothed error signals) are used for comparison.

Room change detection can be made more efficient if only one microphone is utilized for the detection, i.e. it is not necessary to use all microphones available and may be not all room impulse responses, error signals or filtered source signals to definitively detect room changes. In addition, it may also be sufficient to just use the first partition for the comparison, which, if all those facts are taken into account, leads to a very simple and efficient version to robustly detect both soft and hard room changes at once. An example detection procedure that may be implemented in detector 1202 is described below with reference to FIG. 13.

Figure 13:
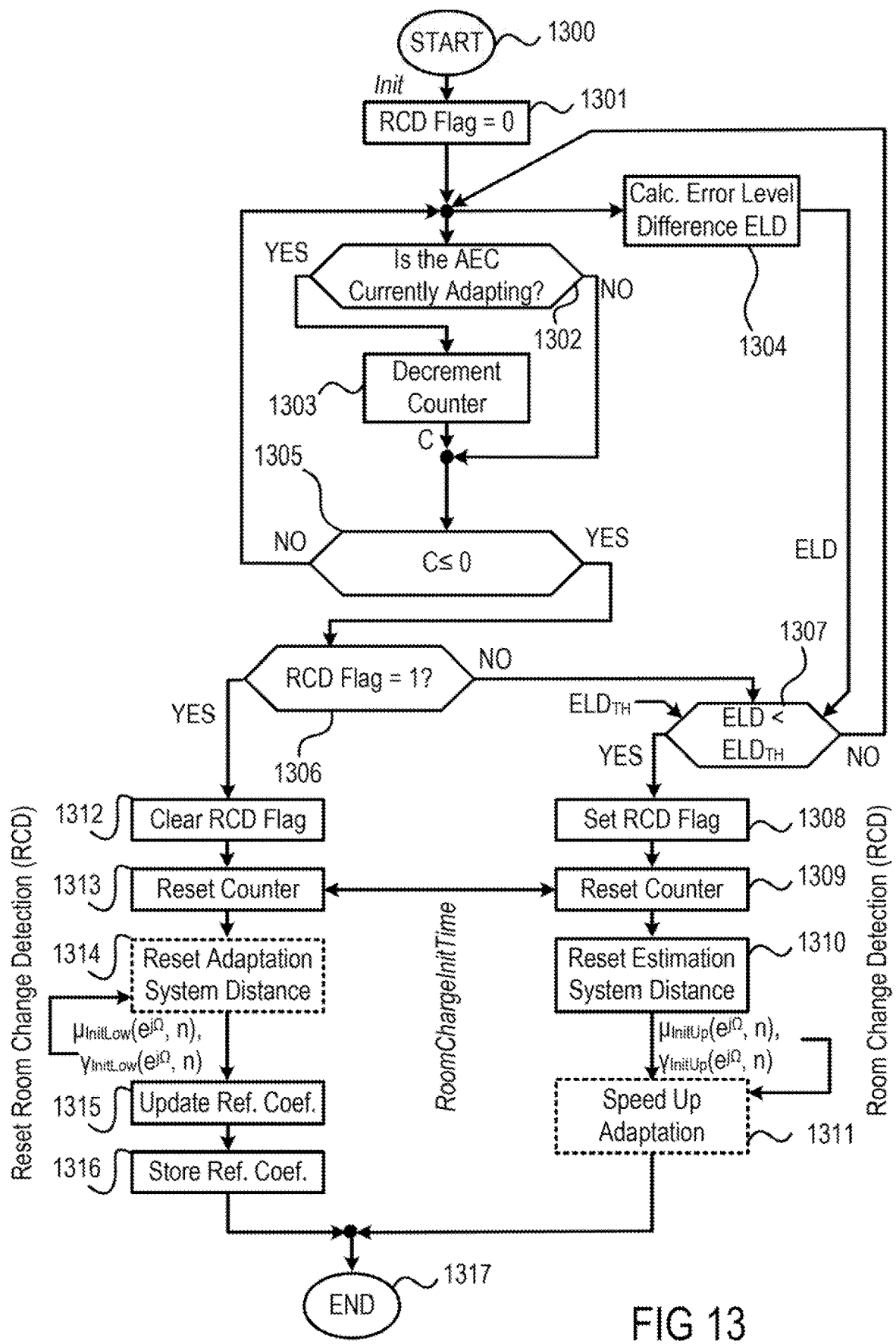
FIG. 13 is a flow diagram illustrating an exemplary room change detection procedure implemented in the acoustic echo controller shown in FIG. 12.

Referring to FIG. 13, upon start (step 1300) an initialization routine (step 1301) is started in which a room change detection (RCD) flag will be cleared (e.g., set to zero, which is indicative of no detected room change). Then the RCD counter will be decremented (optional step 1303) if it is detected that the main acoustic echo filter is in an adapting state (optional step 1302), i.e. if it is not in a freezing state, which is, for example, when no source signal is available or broadcasted. In parallel, an error level difference (ELD) between the main AEC filter and the reference AEC filter is calculated according to $L_{Mn}-L_{Ref}$ (step 1304). Then, an optional current counter value C from step 1303 is provided to the next step 1305. In step 1305, it is determined whether the counter has been expired (C≤0). If this is not true (NO), steps 1302 and 1304 are repeated. If this is true (YES), it is determined in a step 1306 whether the RCD flag is set (e.g., to one, which is indicative of a detected room change) or not (i.e., RCD flag is zero, which is indicative of no detected room change).

In a step 1307, if it turns out that the RCD flag has not been set (i.e., RCD flag==0) since the initialization (indicated by NO), it is determined whether the current error level difference (ELD is below the certain threshold $ELD_{TH}$ (ELD<$ELD_{TH}$) or not. If this is not true (NO), steps 1302 and 1304 are repeated. If it is true (YES), which means that a room change is detected, RCD flag is now newly set (to one) in a step 1308, the RCD counter is reset to its initialization value (RoomChangeInitTime) in a step 1309, the estimated system distance is reset (e.g. set to one) in a step 1310, and, in an optional step 1311, in order to speed-up adaptation, more aggressive step size parameters $\mu I_{nitUp}(e^{j\Omega}, n)$, $\gamma I_{nitUp}(e^{j\Omega}, n)$ for the main AEC filter may be applied or the current filter coefficient set of a shadow AEC filter, which is not shown in FIG. 12, after a room change has been detected may be applied.

In step 1306, if it turns out that the RCD flag has been set (i.e., RCD flag=1) since the initialization and is still set (indicated by YES), which means that the main acoustic echo canceller has already been adapting for a time defined by RoomChangeInitTime, the RCD flag will be cleared, i.e. set to zero, in a step 1312, the RCD counter will be reset to RoomChangeInitTime in a step 1313, the adaptation speed will be reset (if changed before), e.g., the main AEC filter will be reset to its original parameters in an optional step 1314 as defined by $\mu_{InitLow}(e\ j\Omega, n)$, and for an optional shadow AEC filter $\gamma_{InitLow}(e\ j\Omega, n)$, before the current coefficient set of the main AEC filter is stored in the memory in a step 1315, replacing the previous filter coefficient set of the reference AEC filter only for the currently used mode, and finally, the current filter coefficient set of the main AEC filter is copied as currently used filter coefficient set into the reference AEC filter (step 1316), to ensure, that from this point of time on, the detection of future room changes is possible, since the main AEC filter continues adaptation until the end (step 1317). Step 1316 may include that the current coefficient set of the main AEC filter will be stored in the memory, replacing the previous AEC filter coefficient set of the reference AEC filter only for the currently used mode, and the current filter coefficient set of the main AEC filter substitutes the currently used reference AEC filter coefficient set to ensure that, from this point of time on, the detection of future room changes is possible since the main AEC filter continues to adapt.

With the system and method described above, updating mode dependent counters is no longer necessary, since now room changes, as well as all other forms of re-adaptations, will be definitively detected, also including, besides soft and hard room changes, mode changes. The current filter coefficient sets corresponding to the current mode may be stored before a mode change is applied in order to always have the best possible model of the room impulse response(s) stored as reference in the memory.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

It is recognized that any computer, microprocessor, signal processor and microcontroller as disclosed herein may include any number of processors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices (e.g., FLASH, random access memory (RAM), read only memory (ROM), electrically programmable read only memory (EPROM), electrically erasable programmable read only memory (EEPROM)) positioned within the housing. The computer(s), processor(s) and controller(s) as disclosed also include hardware based inputs and outputs for receiving and transmitting data, respectively from and to other hardware based devices as discussed herein.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. An acoustic echo cancelling controller configured to receive a source signal representative of sound broadcast at a first position in a room and a sink signal representative of sound picked up at a second position in the room, the sound picked up at the second position being transferred from the first position according to a transfer function, the controller comprising:
 a first acoustic echo canceller configured to receive the source signal and the sink signal, and to model the transfer function in an adaptive manner based on a first set of coefficients, the first acoustic echo canceller being further configured to provide a first error signal representative of an echo-free residual signal, the first error signal forming an output signal of the controller;
 a second acoustic echo canceller configured to receive the source signal and the sink signal, and to model the transfer function in a non-adaptive manner based on a second set of coefficients, the second acoustic echo canceller being further configured to provide a second error signal;
 a memory operatively coupled with the first acoustic echo canceller and the second acoustic canceller, the memory being configured to store sets of coefficients from the first acoustic echo canceller as sets of reference coefficient and to provide stored sets of reference coefficients to the second acoustic echo canceller; and
 a room change detector operatively coupled with the first acoustic echo canceller and the second acoustic echo canceller, the room change detector being configured to:
  evaluate the first error signal and the second error signal, and detect a room change if the evaluated second error signal is greater than a sum or product of the evaluated first error signal and a first threshold,
  set, for a predetermined period of time, the second set of coefficients equal to the first set of coefficients if a room change is newly detected, and
  copy one of the sets of reference coefficients from the memory to the second acoustic echo canceller and copy the first set of coefficients from the first acoustic echo canceller as another set of reference coefficients into at least one of the second acoustic echo canceller and the memory if a room change is still detected.

2. The controller of claim 1, further configured to operate in different modes of operation, wherein the room change detector is further configured to copy one of the sets of reference coefficients to at least one of the first acoustic echo canceller and second acoustic echo canceller if the mode of operation is changed.

3. The controller of claim 1, wherein the room change detector is further configured to detect whether the first acoustic echo canceller is in an adapting or freezing state, and to halt the detection of room changes as long as a freezing state is detected.

4. The controller of claim 1, wherein:
 the first acoustic echo canceller is configured to operate with a controllable adaptation step size, the adaptation step size being controllable based on estimation system distances.

5. The controller of claim 4, wherein the room change detector is further configured to reset the estimation system distance to a predetermined initialization estimation system distance to adjust an adaptation step size to a first value if a room change is newly detected.

6. The controller of claim 5, wherein the room change detector is further configured to change the adaptation step size from the first value to a second value that is greater than the first value.

7. The controller of claim 5, wherein the room change detector is further configured to reset the step size from the second value to the first value if a room change is still detected.

8. The controller of claim 1, further comprising:
 a first smoother configured to evaluate the first error signal by determining the power or level of the first error signal; and
 a second smoother configured to evaluate the second error signal by determining the power or level of the second error signal.

9. The controller of claim 1, wherein the first acoustic echo canceller operates at least partly in the frequency domain based on spectral partitions.

10. The controller of claim 1, wherein the second acoustic echo canceller operates at least partly in the frequency domain based on spectral partitions.

11. The controller of claim 10, wherein the second acoustic echo canceller operates based on a single spectral partition.

12. The controller of claim 1, further configured to receive at least one of a multiplicity of source signals and a multiplicity of sink signals, wherein the first acoustic echo canceller is a multichannel acoustic echo canceller.

13. The controller of claim 1, further configured to receive at least one of a multiplicity of source signals and a multiplicity of sink signals, wherein the second acoustic echo canceller is a multichannel acoustic echo canceller.

14. The controller of claim 1, further comprising a third acoustic echo canceller configured to receive the source signal and the sink signal, and to model the transfer function in an adaptive manner based on a third set of coefficients, the third acoustic echo canceller being further configured to provide a third error signal representative of an echo-free residual signal to the room change detector, and to operate with a step size that is greater than a step size of the first acoustic echo canceller.

15. The controller of claim 14, wherein the room change detector is further configured to set the third set of coefficients equal to the first set of coefficients if the evaluated third error signal is greater than a sum or product of the evaluated first error signal and a second threshold.

16. The controller of claim 14, wherein the room change detector is further configured to set the first set of coefficients equal to the third set of coefficients if the signal representative of the first error signal is greater than the sum or product of the signal representative of the third error signal and a third threshold value.

17. An acoustic echo cancelling method carried out by a controller having a non-transitory computer readable medium and a processor for executing program code embodied in the non-transitory computer-readable medium, the method comprising the steps of:
 receiving a source signal representative of sound broadcast at a first position in a room and a sink signal representative of sound picked up at a second position in the room, the sound picked up at the second position being transferred from the first position according to a transfer function;
 first acoustic echo cancelling to model the transfer function in an adaptive manner based on a first set of coefficients to provide a first error signal representative of an echo-free residual signal, the first error signal forming an output signal of the controller;

second acoustic echo cancelling to model the transfer function in a non-adaptive manner based on a second set of coefficients to provide a second error signal;

evaluating the first error signal and the second error signal, and detecting a room change if the evaluated second error signal is greater than a sum or product of the evaluated first error signal and a first threshold;

setting, for a predetermined period of time, the second set of coefficients equal to the first set of coefficients if a room change is newly detected;

copying one of sets of reference coefficients stored in a memory to the second acoustic echo canceller; and copying the first set of coefficients from the first acoustic echo canceller as a set of reference coefficients into at least one of the second acoustic echo canceller and the memory if a room change is still detected.

18. The method of claim 17, further comprising different modes of operation, wherein one of the sets of reference coefficients is copied to at least one of the first acoustic echo cancelling and second acoustic echo cancelling if the mode of operation is changed.

19. The method of claim 17, further comprising detecting whether the first acoustic echo cancelling is in an adapting or freezing state, and halting the detection of room changes as long as a freezing state is detected.

20. The method of claim 17, wherein the first acoustic echo cancelling operates with a controllable adaptation step size, the adaptation step size being controllable based on estimation system distances.

21. The method of claim 20, further comprising resetting the estimation system distance to a predetermined initialization estimation system distance to adjust an adaptation step size to a first value if a room change is newly detected.

22. The method of claim 21, further comprising changing the adaptation step size from the first value to a second value that is greater than the first value.

23. The method of claim 21, further comprising resetting the step size from the second value to the first value if a room change is still detected.

24. The method of claim 17, further comprising:
a first smoothing to evaluate the first error signal by determining the power or level of the first error signal; and
a second smoothing configured to evaluate the second error signal by determining the power or level of the second error signal.

25. The method of claim 17, wherein the first acoustic echo cancelling is performed at least partly in the frequency domain based on spectral partitions.

26. The method of claim 17, wherein the second acoustic echo cancelling is performed at least partly in the frequency domain based on spectral partitions.

27. The controller of claim 26, wherein the second acoustic echo cancelling operates based on a single spectral partition.

28. The method of claim 17, further receiving at least one of a multiplicity of source signals and a multiplicity of sink signals, wherein the first acoustic echo cancelling is multichannel acoustic echo cancelling.

29. The method of claim 17, further configured to receive at least one of a multiplicity of source signals and a multiplicity of sink signals, wherein the second acoustic echo cancelling is multichannel acoustic echo cancelling.

30. The method of claim 17, further comprising third acoustic echo cancelling to model the transfer function in an adaptive manner based on a third set of coefficients, the third acoustic echo cancelling providing a third error signal representative of an echo-free residual signal for the room change detection and operating with a step size that is greater than a step size of the first acoustic echo cancelling.

31. The method of claim 30, further comprising setting the third set of coefficients equal to the first set of coefficients if the evaluated third error signal is greater than a sum or product of the evaluated first error signal and a second threshold.

32. The method of claim 30, further comprising setting the first set of coefficients equal to the third set of coefficients if the signal representative of the first error signal is greater than the sum or product of the signal representative of the third error signal and a third threshold value.

* * * * *